Sept. 11, 1962  F. MEISSNER  3,053,842
MIXING METHOD
Filed April 25, 1960
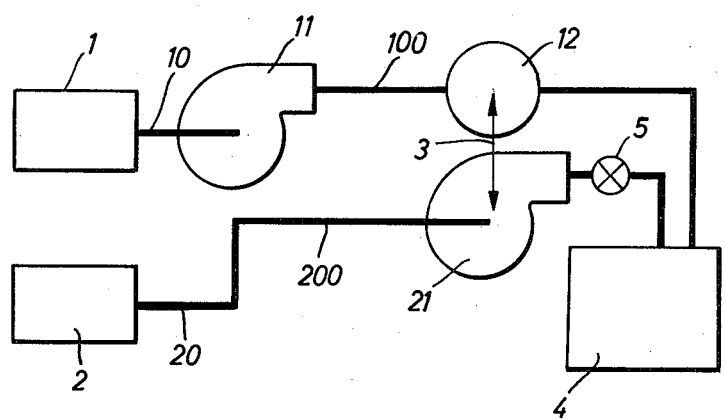
INVENTOR:
Fritz Meissner
BY
Patent Agent United States Patent Office 3,053,842
Patented Sept. 11, 1962

3,053,842
MIXING METHOD
Fritz Meissner, Koln-Bayental, Germany, assignor to Firm Josef Meissner, Koln-Bayenthal, Germany
Filed Apr. 25, 1960, Ser. No. 25,820
Claims priority, application Germany Feb. 8, 1957
4 Claims. (Cl. 260—248.5)

The present invention relates to a method of mixing with each other two substances to produce an explosive.

More particularly, the present application, which is a continuation-in-part of application Serial No. 711,432, filed January 27, 1958, now abandoned, concerns itself with a method of mixing with each other two substances to produce an explosive in which one of the substances has such properties that if it were supplied in excess a hazardous reaction would result, whereas the other of the substances has such properties that if it were supplied in excess no hazardous reaction would result. The first-mentioned of these substances is hereinafter referred to as the "hazardous" substance or medium whereas the other is referred to as the "non-hazardous" substance or medium.

In mixing or blending several free flowing media of which an excess of at least one is capable of producing a hazardous reaction, care must be taken that this material, as, for example, glycerine, glycol, hexamine (hexamethylenetetramine) is never present in excess as compared with a given ratio of components if the observation of a given ratio of components with respect to the maximum portion of the hazardous material or materials in the mixture, as, for example, in case of a nitration, is required to avoid unintended reactions.

Attempts have already been made to meet this requirement. In case of the certain known processes, the media to be mixed with one another are conveyed independently, and counting devices or recording mechanisms are provided in the conveying pipe lines or conveying devices so that the respective quantities flowing through are used as a regulating means to control a valve positioned in the pipe line of the hazardous medium.

Although these known mixing controllers are generally accurate in operation, they are susceptible to troubles, especially due to the installation of the regulating and controlling devices, so that the formation of a hazardous mixture cannot be prevented with certainty.

It is, therefore, an object of the present invention to provide a method of mixing with each other such hazardous and non-hazardous materials that at no time will there be an excess of the hazardous material, and, with this object in view, the present invention resides mainly in a mixing method which comprises the steps of (a) moving the non-hazardous substance from a supply vessel to a mixing vessel under the influence of a first mover, and (b) moving the hazardous substance from a supply to the mixing vessel by a second mover separate from the first mover, which second mover derives its energy exclusively from the kinetic energy of the non-hazardous substance while this non-hazardous substance is being moved by the first mover. As a result, the quantity of the hazardous substance which is being supplied to the mixing vessel is limited by the rate at which the non-hazardous substance is supplied to the mixing vessel, thereby making it impossible for an excess of the hazardous substance to be supplied to the mixing vessel.

This results in a constrained interdependence between the conveying means involved preventing in any case the portion of the hazardous medium in the mixture from increasing beyond the given value because the quantity conveyed of the hazardous material must of necessity decrease as the quantity conveyed of the non-hazardous medium decreases. If a non-hazardous material is not conveyed at all, the conveying means of the hazardous medium likewise will not be driven so that this medium also will fail to appear. If, however, the non-hazardous material is being conveyed and the conveying device of the hazardous medium driven by the non-hazardous medium fails, the resulting mixture will become useless due to the too high portion of non-hazardous medium, but this can never give rise to a hazardous reaction.

An installation for carrying out the process of the invention is one wherein the conveying device or the like for the hazardous medium is dependent upon the non-hazardous medium being conveyed.

In such an installation a motor, which is preferably a fluid motor driving the conveying means of another medium, is preferably arranged in the pipe line of a medium being conveyed and under pressure.

Although the mechanical connection between the motor and the conveying means is the absolutely most reliable one and, therefore, that which corresponds mostly to the object of the invention, it is especially the use of the electric amplifying technique which offers the possibility of reducing the power required of the motor driven by the non-hazardous medium.

Medium or material, in the sense of the invention, is understood to be any free flowing material, i.e., any liquid or pulverulent or granular material, and the driving medium or the medium which is under pressure is always understood to be that which may be present in excess.

The appended drawing shows the diagram of a device by means of which the process of the invention can be carried out in a particularly simple manner.

This device includes a vessel 1 containing a non-hazardous medium, i.e., for example, a nitrating acid such as nitric acid or a mixed acid. To this vessel is connected a pipe line 10 in which a centrifugal pump 11 is installed. The pipe section 100 connects this pump with the motor 12 which, in the present case, is constructed as a fluid motor. The pipe section extending from this motor terminates in the mixing or reaction vessel 4.

The vessel 2 contains the hazardous medium, i.e. the medium which must by no means be allowed to be present in excess in the finished mixture, as, for example, hexamine, glycerine, or glycol. The vessel 2 is arranged at a lower level than the mixing vessel 4 so that conveying of the medium of the vessel 2 is only possible with the use of mechanical energy. This vessel is connected with the pump 21 by the pipe line 20–200 and the discharge line of this pump terminates in the mixing vessel 4.

Between the motor of the pipe line 100 and the pump 21 of the pipe line 200 there is a permanent connection 3 in which an adjustable gear may be provided so that the ratio of components in the mixture is variable from time to time.

If the pump 11 is driven, acid is conveyed through the pipe line 10–100 and passed to the mixing vessel 4. Depending upon the conveying capacity of the pump 11, the fluid motor 12 is driven at a more or less high circumferential speed so that its number of revolutions is dependent upon that of the pump 11.

Since this motor is directly connected with the pump 21 of the pipe line 20–200, the number of revolutions of this pump is proportional to that of the motor 12 so that the quantity conveyed through the line 20–200 is necessarily dependent upon that quantity which is being conveyed in the pipe sections 10–100.

It is evident from the above that in case of a failure of whatever kind and with the mixing ratio once adjusted, there can be present only an excess of non-hazardous medium which drives the conveying device of the hazardous medium which must not be allowed to be present in excess.

The process of the invention is applicable not only in case of continual conveyance but also in case of stepwise conveying, or in case of conveying with a reciprocating motion and the like. It also is applicable in an installation using electrical or other transmission means or coupling elements.

A gear or the like (not shown) provided in the connection 3 permits the adjustment of various ratios of components.

The motor driven by the medium being conveyed may be of a type, the number of revolutions of which is necessarily proportional to the flow. Moreover, it is advantageous if the conveying capacity of the conveying device is necessarily proportional to its speed.

The following examples are illustrative but not limitative of the present invention.

Example 1

Nitroglycerin may be produced by treating glycerin with a mixed acid consisting essentially of 50% concentrated nitric acid and 50% concentrated sulphuric acid. The mixed acid and the glycerin are supplied to the reaction vessel 4 in a quantity ratio of 5:1, where the following reaction takes place:

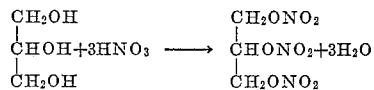

By coupling together with the proper gear ratio the fluid motor 12 which is driven by the mixed acid and the driving pump 21 which moves the glycerin, there will be delivered to the vessel 4 during normal operation of the system, 10 kg. mixed acid for each 2 kg. glycerin. If less mixed acid is delivered per unit time, then the motor 12 runs proportionately slower so that the pump 21 will during the same period run more slowly and deliver less glycerin. For instance, if only half the normal amount of mixed acid is being delivered by the centrifugal pump 11, then the fluid motor will run at half speed which, in turn, will cause the pump 21 to deliver but half the normal amount of glycerin. Going one step further, if the container 1 becomes empty or if the line 10–100 becomes clogged, then no mixed acid will be available to drive the fluid motor 12 so that the pump 21 will cease to operate, whereupon no glycerin at all will be supplied to the vessel 4.

It will be noted that if the glycerin container 2 runs dry, it will still be possible for mixed acid to be pumped into the mixing vessel 4. This, however, will not produce any dangerous reaction because the proportion of glycerin in the vessel 4 will be reduced.

It should also be noted that if the pumps 11 and 21 were driven by a common motor, as is the known practice, then in case the mixed acid container runs dry, glycerin would continue to be delivered to the vessel 4 until a proportion of glycerine is reached which would cause a dangerous explosive reaction.

Example 2

Cyclotrimethylenetrinitramine (also known as cyclonite) is produced by mixing solid hexamethylenetetramine (also known as hexamine) and fuming nitric acid. The acid and the hexamine are mixed in a quantity ratio of 9:1, and produce the following reaction:

$$C_6H_{12}N_4 + 3HNO_3 \rightarrow C_3H_6N_6O_6 + 3HCHO + NH_3$$

Inasmuch as hexamine is a solid, the moving means 21 must be modified accordingly. For example, hexamine in pulverulent form may be moved by a conveyor screw of a type well known in the art. This screw is installed in place of the pump 21 and is coupled to the fluid motor 12 in a manner necessary to move the desired quantity of hexamine depending upon the quantity of acid being moved by the pump 11. Thus, the transmission ratio will be somewhat different than was the case in Example 1; in particular, the ratio is so selected that the conveyor screw which delivers material at a rate that is proportional to its rotational speed, will deliver 1 kg. of hexamine for every 9 kg. of nitric acid moving through the fluid motor.

It will be appreciated that if both containers 1 and 2 are filled, then hexamine and acid will be delivered at the desired ratio. If, however, the acid container runs dry or if the line 10–100 becomes clogged, then no more hexamine will be moved, thereby making it impossible for any excess hexamine to be delivered to the mixing vessel 4, although it is possible for excess acid to be pumped into the vessel 4. This, however, will not produce any dangerous reaction, as explained above.

It will be understood that the above description of the present invention is susceptible to various modifications, changes and adaptations, and the same are intended to be comprehended within the meaning and range of equivalents of the appended claims.

I claim:

1. A method of mixing with each other two substances to produce an explosive, one of which substances is selected from the group consisting of glycerin, glycol, and hexamethylenetetramine so that if said one substance were supplied in excess a hazardous reaction would result whereas the other of the substances is acidic so that if it were supplied in excess no hazardous reaction would result, said method comprising the steps of: moving said other substance from a supply vessel to a mixing vessel under the influence of a first mover, and moving said one substance from a supply vessel to the mixing vessel by a second mover separate from the first mover, which second mover derives its energy exclusively from the kinetic energy of said other substance while said other substance is being moved by the first mover, whereby the quantity of said one substance which is being supplied to the mixing vessel is limited by the rate at which said other substance is being supplied to the mixing vessel, thereby making it impossible for an excess of said one substance to be supplied to the mixing vessel.

2. The method defined in claim 1 wherein the exposive being produced is nitroglycerin and said one substance is glycerin.

3. The method defined in claim 2 wherein said other substance is a mixed acid consisting essentially of 50% concentrated nitric acid and 50% concentrated sulphuric acid.

4. The method defined in claim 1 wherein the explosive being produced is cyclotrimethylenetrinitramine, wherein said one substance is hexamethylenetetramine, and wherein said other substance is fuming nitric acid.

References Cited in the file of this patent
UNITED STATES PATENTS

| | | |
|---|---|---|
| 715,031 | Davidson | Dec. 2, 1902 |
| 2,009,622 | Kennedy | July 30, 1935 |
| 2,203,980 | Burt | June 11, 1940 |
| 2,306,601 | Harrington | Dec. 29, 1942 |